United States Patent
Kettenis

(10) Patent No.: US 12,266,082 B2
(45) Date of Patent: Apr. 1, 2025

(54) 2D RECURSIVE DE-BANDING

(71) Applicant: V-Silicon Semiconductor (Hefei) Co., Ltd, Hefei (CN)

(72) Inventor: Jeroen Maria Kettenis, Geldern (DE)

(73) Assignee: V-Silicon Semiconductor (Hefei) Co., Ltd, Hefei (CN)

( * ) Notice: Subject to any disclaimer, the term of this patent is extended or adjusted under 35 U.S.C. 154(b) by 386 days.

(21) Appl. No.: 17/587,936

(22) Filed: Jan. 28, 2022

(65) Prior Publication Data
US 2023/0245286 A1    Aug. 3, 2023

(51) Int. Cl.
| | |
|---|---|
| *G06T 5/20* | (2006.01) |
| *G06T 1/60* | (2006.01) |
| *G06T 5/70* | (2024.01) |
| *H04N 19/117* | (2014.01) |

(52) U.S. Cl.
CPC ............... *G06T 5/20* (2013.01); *G06T 1/60* (2013.01); *G06T 5/70* (2024.01); *G06T 2207/20012* (2013.01); *G06T 2207/20032* (2013.01); *H04N 19/117* (2014.11)

(58) Field of Classification Search
CPC .... G06T 5/70; G06T 5/20; G06T 1/60; G06T 2207/20012; G06T 2207/20032; H04N 19/117
See application file for complete search history.

(56) References Cited

U.S. PATENT DOCUMENTS

| | | | | |
|---|---|---|---|---|
| 5,659,370 | A  * | 8/1997 | Mancuso | H04N 7/012 708/316 |
| 6,728,416 | B1 * | 4/2004 | Gallagher | G06T 5/20 382/265 |
| 7,903,901 | B2 * | 3/2011 | Mitchell | H04N 19/182 382/265 |
| 2005/0248687 | A1 * | 11/2005 | Lee | G06T 5/73 345/581 |
| 2010/0245672 | A1 * | 9/2010 | Erdler | H04N 19/192 348/E5.078 |

(Continued)

OTHER PUBLICATIONS

Tu et al., "Adaptive Debanding Filter," in IEEE Signal Processing Letters, vol. 27, pp. 1715-1719, 2020, doi: 10.1109/LSP.2020.3024985. (Year: 2020).*

(Continued)

*Primary Examiner* — Ming Y Hon
*Assistant Examiner* — Julia Z. Yao
(74) *Attorney, Agent, or Firm* — Schwegman Lundberg & Woessner, P.A.

(57) ABSTRACT

A method of recursive filtering of image data includes receiving sequentially a plurality of original pixel values, multiplying an original pixel value of a current pixel of the plurality of pixel values by a dynamically varying recursion coefficient, adding recursively filtered pixel values from left and right neighbors of the current pixel, retrieved from a memory buffer holding filtered pixel data from a previous image line, multiplying the added recursively pixel values by 1 minus the dynamically varying recursion coefficient, adding the two multiplication results together to yield a filtered pixel value for the current pixel, writing the filtered pixel value for the current pixel back into the memory buffer, and displaying the filtered pixel value on a display.

15 Claims, 5 Drawing Sheets

(56) References Cited

U.S. PATENT DOCUMENTS

| | | | | |
|---|---|---|---|---|
| 2014/0156216 | A1* | 6/2014 | Ten Kate | G08B 21/0446 702/142 |
| 2015/0085921 | A1* | 3/2015 | Chou | H04N 19/129 375/240.03 |
| 2015/0117793 | A1* | 4/2015 | Deng | G06T 5/20 382/261 |
| 2021/0285979 | A1* | 9/2021 | Gebru | G01C 19/56 |
| 2022/0167908 | A1* | 6/2022 | D'Arcy | A61B 5/398 |

OTHER PUBLICATIONS

Haritha et al., "Low-pass filtering in CSD space and sparsity based denoising," 2017 International Conference on Trends in Electronics and Informatics (ICEI), Tirunelveli, India, 2017, pp. 788-792, doi: 10.1109/ICOEI.2017.8300812. (Year: 2017).*

Kuo et al., "Channel noise filtering for subband image coding using vector quantization," Proceedings of APCCAS'94—1994 Asia Pacific Conference on Circuits and Systems, Taipei, Taiwan, 1994, pp. 630-635, doi: 10.1109/APCCAS.1994.514625. (Year: 1994).*

Baugh et al. 2014. Advanced video debanding. In Proceedings of the 11th European Conference on Visual Media Production (CVMP '14). Association for Computing Machinery, New York, NY, USA, Article 7, 1-10. https://doi.org/10.1145/2668904.2668912 (Year: 2014).*

Huang et al., "Understanding and Removal of False Contour in HEVC Compressed Images," in IEEE Transactions on Circuits and Systems for Video Technology, vol. 28, No. 2, pp. 378-391, Feb. 2018, doi: 10.1109/TCSVT.2016.2607258. (Year: 2016).*

Song, Q. (2017). Perceptual Video Quality Preservation and Enhancement. UC San Diego. ProQuest ID: Song_ucsd_0033D_16482. Merritt ID: ark:/13030/m5jd9rft. Retrieved from https://escholarship.org/uc/item/60d861vm (Year: 2017).*

Werner, "Drift analysis and drift reduction for multiresolution hybrid video coding," Signal Processing: Image Communication, vol. 8, issue 5,1996. doi: https://doi.org/10.1016/0923-5965(95)00060-7 (Year: 1996).*

Guo et al., "Integration of Recursive Temporal LMMSE Denoising Filter Into Video Codec," in IEEE Transactions on Circuits and Systems for Video Technology, vol. 20, No. 2, pp. 236-249, Feb. 2010, doi: 10.1109/TCSVT.2009.2031453. (Year: 2010).*

Ohm, "Advances in Scalable Video Coding," in Proceedings of the IEEE, vol. 93, No. 1, pp. 42-56, Jan. 2005, doi: 10.1109/JPROC. 2004.839611. (Year: 2005).*

Bhagavathy, Sitaram, "Multiscale Probabilistic Dithering for Suppressing Contour Artifacts in Digital Images", S. Bhagavathy, J. Llach and J. Zhai, "Multiscale Probabilistic Dithering for Suppressing Contour Artifacts in Digital Images," in IEEE Transactions on Image Processing, vol. 18, No. 9, pp. 1936-1945, Sep. 2009., (Sep. 2009), 1936-1945.

Song, Quing, et al., "Hardware-Efficient Debanding and Visual Enhancement Filter for Inverse Tone Mapped High Dynamic Range Images and Videos", Q. Song, G. Su and P. C. Cosman, "Hardware-efficient debanding and visual enhancement filter for inverse tone mapped high dynamic range images and videos," 2016 IEEE International Conference on Image Processing (ICIP), Phoenix, AZ, 2016, pp. 3299-3303., (2016), 3299-3303.

* cited by examiner

2D RECURSIVE DE-BANDING

BACKGROUND

A de-banding filter eliminates or reduces false contours that are seen on images that have been quantified to a low number of bits per sample. In order to be still effective with high resolution images (like image resolutions going up from HD to UHD 4K, to UHD 8K), such filters tend to become very and increasingly large especially regarding the required memory footprint.

BRIEF SUMMARY

In one aspect, a system and method of recursive filtering of image data includes receiving sequentially a plurality of original pixel values, multiplying an original pixel value of a current pixel of the plurality of pixel values by a dynamically varying recursion coefficient, adding recursively filtered pixel values from left and right neighbors with some vertical offset of the current pixel, retrieved from a memory buffer holding filtered pixel data from a previous image line, multiplying the added recursively pixel values by 1 minus the dynamically varying recursion coefficient, adding the two multiplication results together to yield a filtered pixel value for the current pixel, writing the filtered pixel value for the current pixel back into the memory buffer, and displaying the filtered pixel value on a display.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
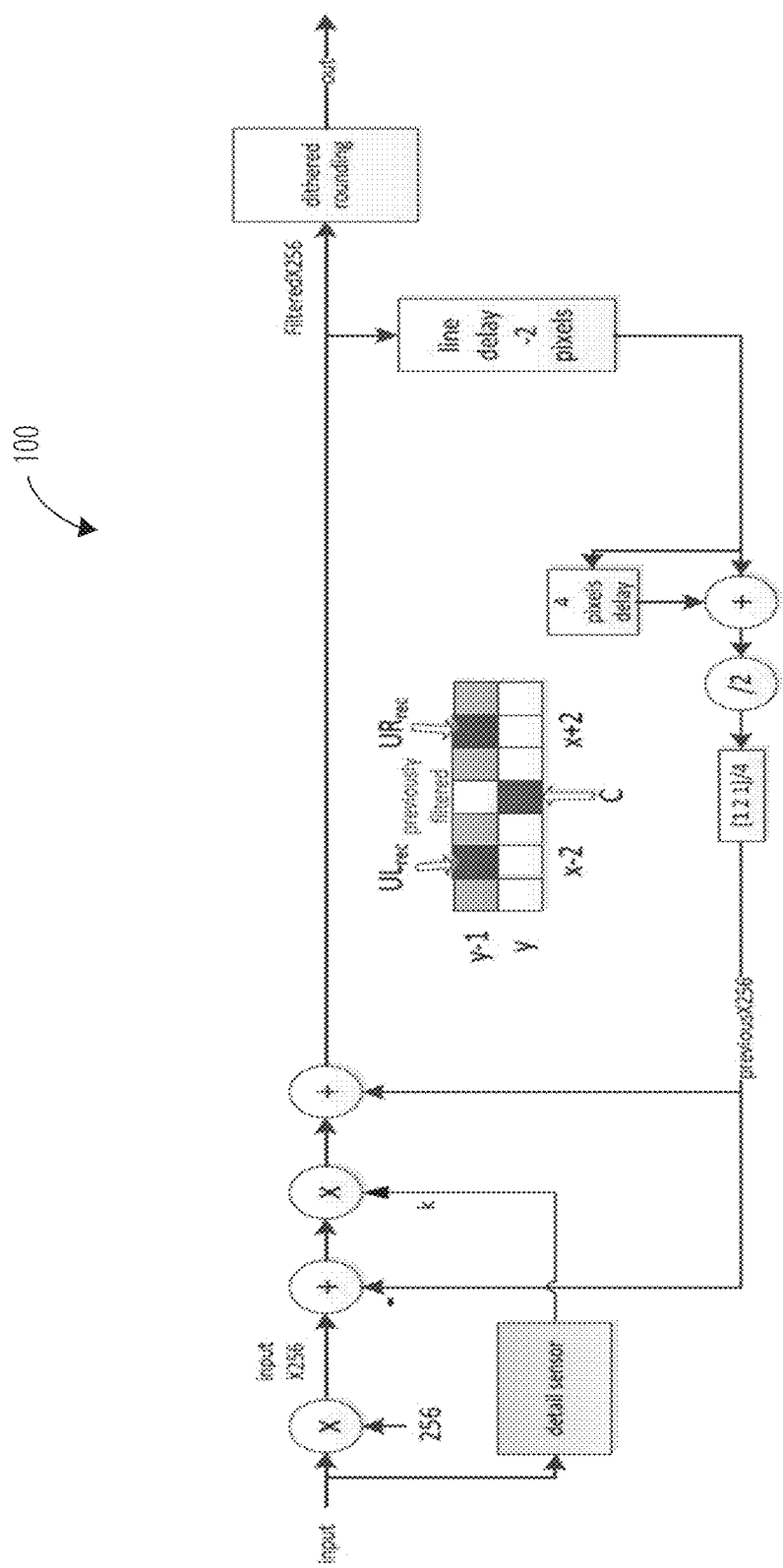
FIG. 1 illustrates a de-banding system in accordance with one embodiment.

False contours or bands seen in low-gradient areas in an image are merely a result of inadequate quantization of image data in previous operations. Often applied in early parts of the chain is quantization at 8 bits. This is notably so e.g. in video encoders. There also noise, dithering and error dispersal gets removed and thus solid bands result in areas with original soft slopes. Thus, without specific measures, later in the chain this quantization level remains in the representation of the images. Soft slopes in an image, represented in 8 bits give well visible false contours and thereby bands of distinct levels. These are judged as annoying, especially when presented well visibly on large displays with significant light output, such as with current TV's. Embodiments severely restrict the total size of pixel-data delay required. This gives a strongly increasing cost advantage with higher image resolutions. In the approach, a recursive, adaptive low-pass filtering is realized, that works two-dimensionally, FIG. 1 illustrates a de-banding system 100 in accordance with one embodiment. The system 100 can be represented mathematically as:

To get a filter result at a pixel position, the recursion is done with

Out=$k$*C+(1−$k$)*(ULrec+URrec), where $k$ is the dynamically varying recursion coefficient, operated in the range <0 . . . 1]

C is the original pixel value at the current pixel position at pixel position (y, x)

ULrec is (a slightly low-passed version of) the recursively filtered pixel level at an Upper Left neighbor pixel position (y−1, x−n)

URrec is (a slightly low-passed version of) the recursively filtered pixel level at an Upper Right neighbor pixel position (y−1, x+n)

Out is the filtered pixel value at the current pixel position where:

n is a design-choice parameter, e.g. 2

'a slightly low-pass' is a design choice, e.g. filtering by [1 2 1]/4 (so averaging its central pixel value with the average of the values of its two neighbor pixels) The 'slight low-pass filtering' mentioned above is necessary when the upper left and upper right positions are more than one pixel apart from the current pixel's x position. It prevents that all the filtered odd pixel only filter from original odd pixels and likewise for all even pixels, which could have led to a checkerboard patterning.

Instead of using for ULrec pixel data from the previous line, it is possible to take data from the same line at the left side of the position of C, so e.g. at a position (y, x−1).

A factor k defines the strength of the recursive filtering and is necessarily adaptive to at least the local content of the input. By allowing the k factor to go to very low values (order of magnitude 0.01~0.001) the recursive filter can very slowly follow the trend of the input and thus smoothly go over areas with banding, even when those banding contours are dozens to hundreds of pixels and/or lines apart. Regarding the required memory footprint, effective filtering is realized with the cost of only a single line buffer that has a size approximately equal to the width of the image. As the k-factor is driven to very low levels, that the recursion (the multiplication and the line delay) is implemented with high precision, so with substantially more bits (e.g. 8 more) than required for the final output bit-width. This enhanced precision in the loop prevents that the filtered output keeps hooked to its previous level, even when there is continuously a positive or continuously a negative difference signal between the recursive 'previous' signal and the input.

Cost wise, the necessary delay is implemented by approximately one line memory. For applying the solution to a higher image resolution, the adaptation is realized by:

enabling the k factor to get closer to (but not reaching) 0 providing the higher accuracy in the loop implementing the line-memory according the horizontal dimension of that image resolution.

The above items can be foreseen upfront for the highest applicable image resolution of the design and will then be appropriate also for processing lower resolution images, provided that the k range is adapted adequately. When the input of the recursion shows detail, the k factor is quickly lifted to 1.0, but when detail ends, the k factor is only slowly allowed to go down to the desired low level. This assures that the filter content is not hooking to any specific pixel input value (giving undesired tails), but aligns to an average over a certain area, thus keeping a smooth result. The k-factor is controlled from some detail sensor (or alternatively a banding area sensor), that produces a low k value (approaching, but not reaching 0) when there is no significant image detail determined in the surrounding image area and approaching and reaching 1, where surrounding image detail is determined to be significant. The detail sensing in an area around the current pixel position can internally also apply recursive filtering as well as substantial subsampling, so that the required memory footprint for this is also minimal, being a fraction, such as ⅛th of a line-memory. It is likely that the recursive filter output has much higher bit accuracy than the bit-depth of the final output (=input of any following processing stage). To maintain that higher accuracy, a form of dithered or error dispersal rounding will be useful.

Figure 2:
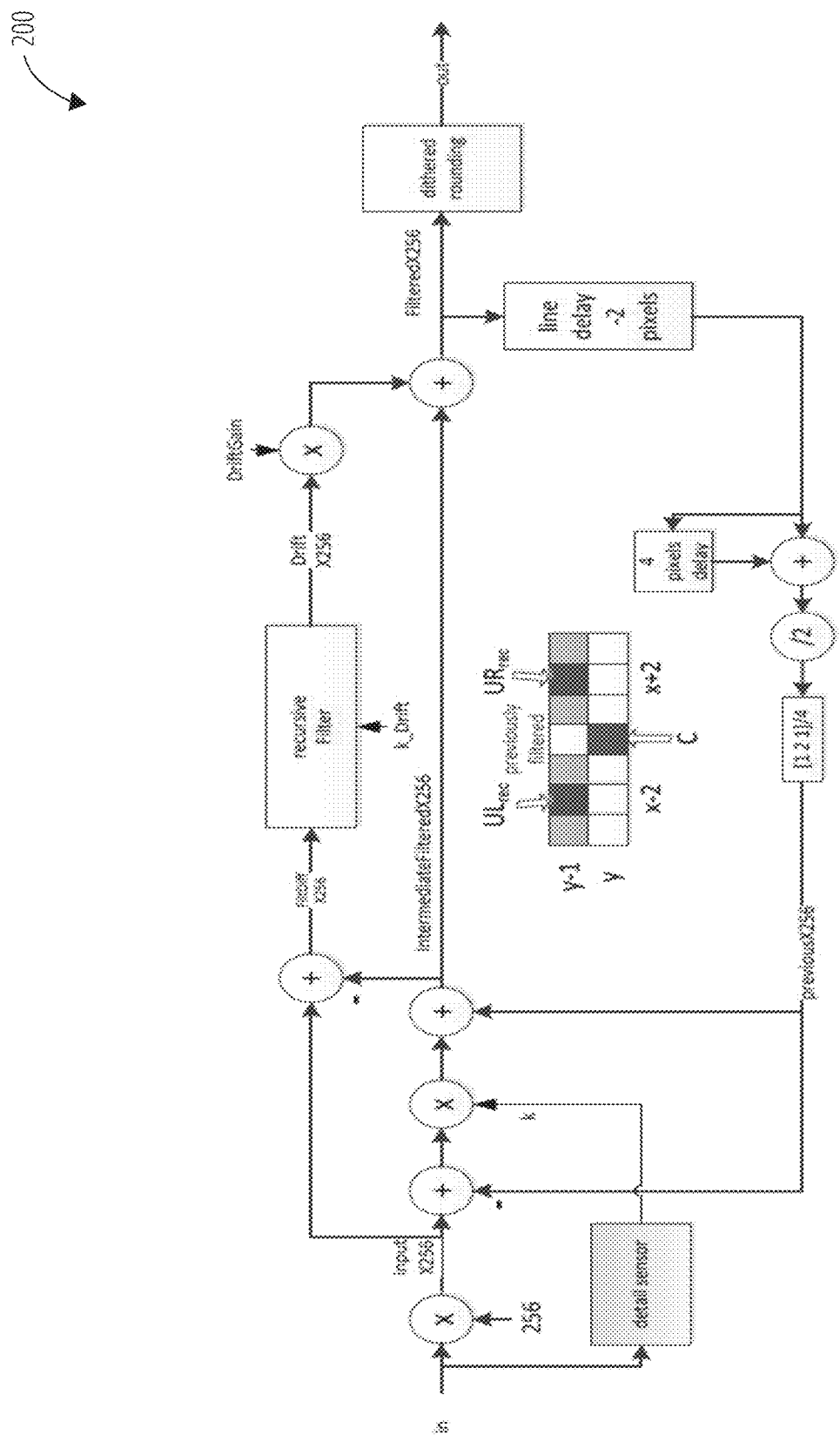
FIG. 2 illustrates a de-banding system in accordance with one embodiment.

FIG. 2 illustrates a de-banding system 200 in accordance with one embodiment. The system 200 provides for a reduction of the drift between the intermediate recursive output and its input. In FIG. 2 it is shown that the Drift signal is generated by low-passing of the difference between the input and the intermediate-filtered signal. This low-pass filtering is also achieved by means of a recursive filter. A fraction (like 0.02) of a low-passed version of the Drift difference signal is added into the loop in order to reduce it towards zero. Given the nature of this Drift signal to be very low-frequency, it is possible to reduce the memory footprint of this drift-calculation recursion loop, by applying substantial subsampling (like by a factor of 8). The mentioned fraction needs to be well-chosen in order to keep stability of the loop-in-loop construction as well as having a clear 'drift' limiting effect.

Figure 3:
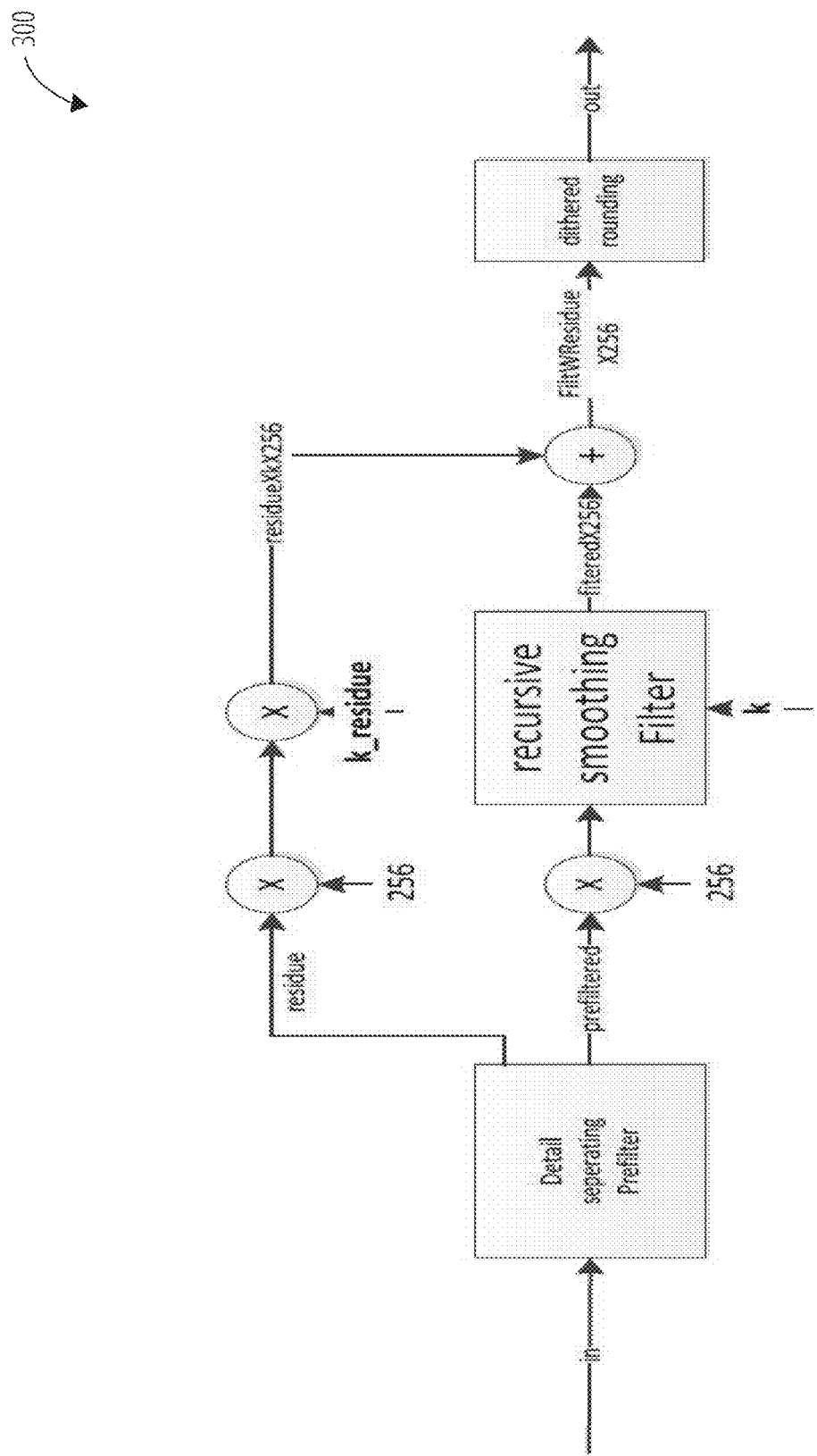
FIG. 3 illustrates a recursive filtering system with detail bias in accordance with one embodiment.

FIG. 3 illustrates a recursive filtering system 300 with detail bias in accordance with one embodiment. The system 300 enables splitting out small detail and bypassing that around the above described form of recursive filtering (as in FIG. 1 or FIG. 2). The small detail size that is targeted here to get separated is between a single and a few dozens of pixels wide and some lines high. The detail separating filter system 300 may be a linear band-split filter, with the pre-filtered signal being the low frequency content and the residue signal equaling the remaining high-frequency content.

Figure 4:
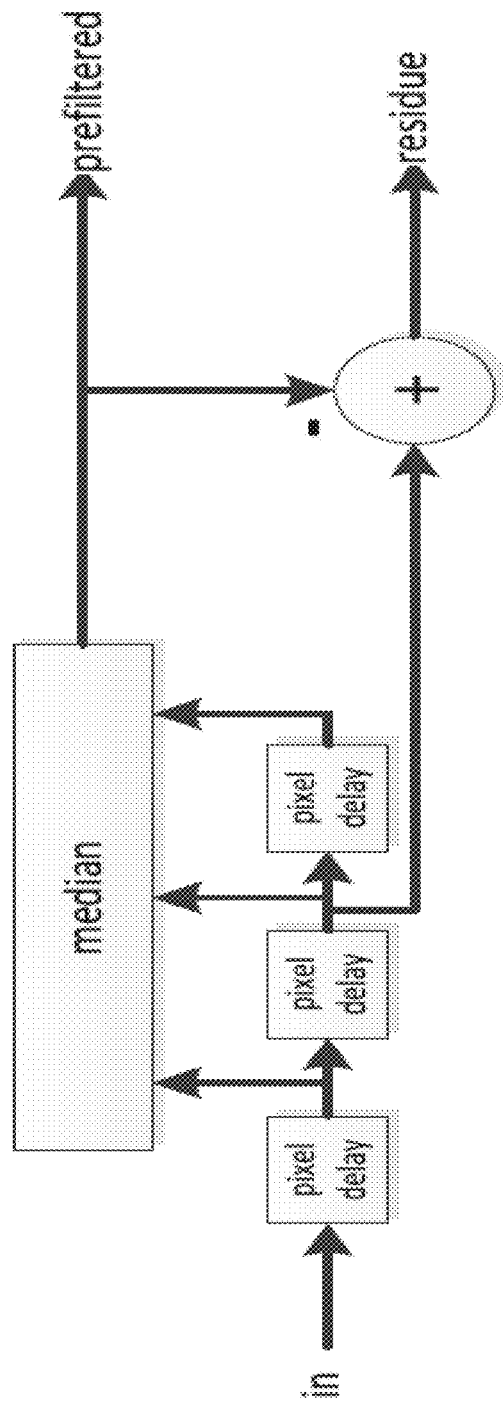
FIG. 4 illustrates a non-linear detail separating filter in accordance with one embodiment.

FIG. 4 illustrates a non-linear detail separating filter 400 in accordance with one embodiment. The filter 400 may be based on some form of median filtering. In the non-linear filtering case, there may be distortion present in both the pre-filtered and in the residue signals, yet these distortions will compensate each other later, after being added back together. This enhancement enables preservation of spatially-small details up to a desired size (determined by the design of the pre-filter), without having the smoothing filter to get adaptive to the original detail (instead only with its remainder in the pre-filtered signal) and thus more capable to keep low-pass filtering effective in the area around the detail. Full preservation of the detail is achieved, when the 'k_residue' factor applied in the bypass path is kept identical to the 'k' of the recursive smoothing filter. Optionally, the 'k_residue' level is also lifted towards 1.0 when there is detail found that is not passed to the recursive filter. In that case the detail will be reproduced with partial distortion.

Figure 5:
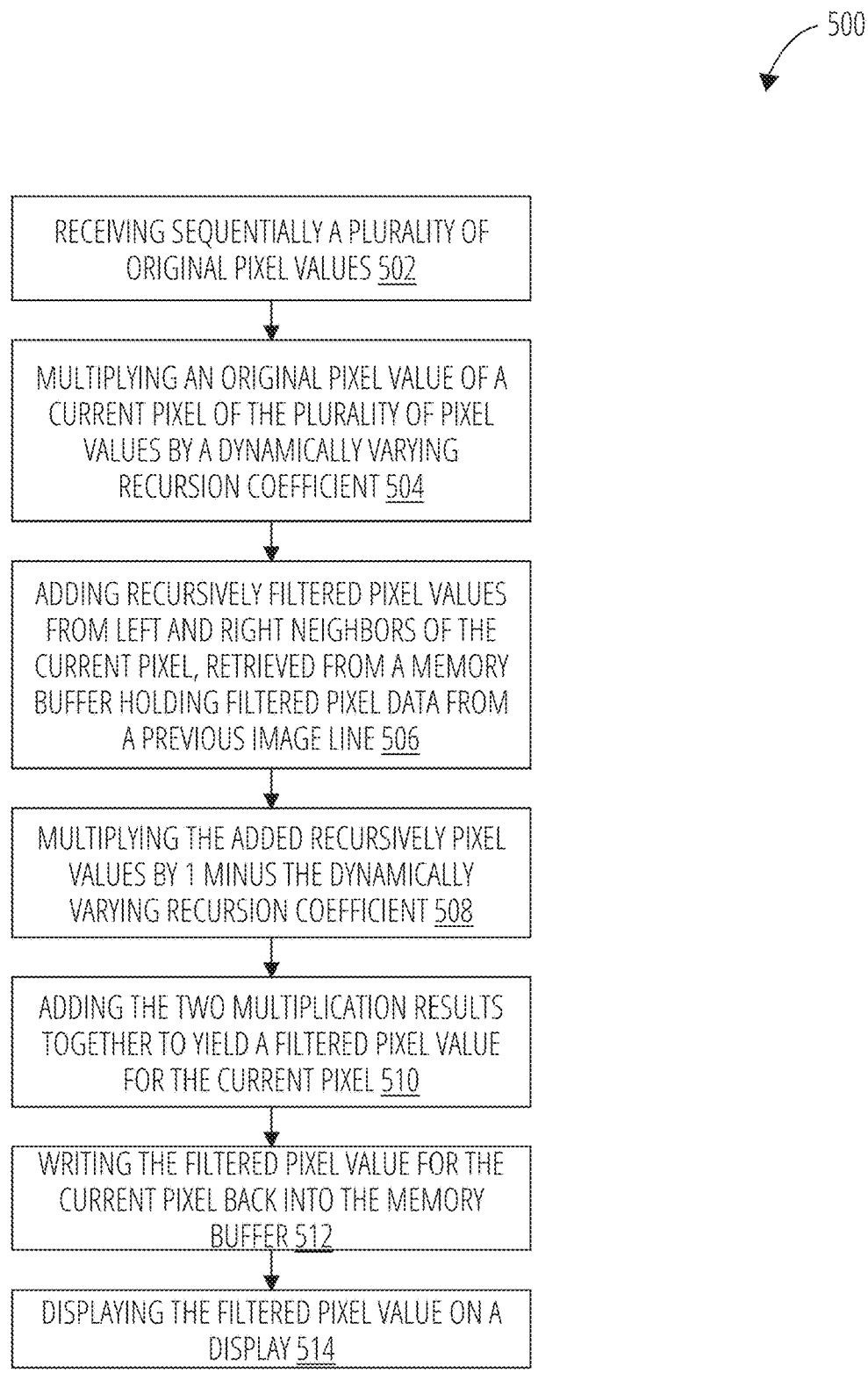
FIG. 5 illustrates a method recursive de-banding in accordance with one embodiment.

FIG. 5 illustrates a method 500 recursive de-banding in accordance with one embodiment. The method 500 comprises, in block 502, receiving sequentially a plurality of original pixel values. In block 504, multiplying an original pixel value of a current pixel of the plurality of pixel values by a dynamically varying recursion coefficient. In block 506, adding recursively filtered pixel values from left and right neighbors of the current pixel, retrieved from a memory buffer holding filtered pixel data from a previous image line. In block 508, multiplying the added recursively pixel values by 1 minus the dynamically varying recursion coefficient. In block 510, adding the two multiplication results together to yield a filtered pixel value for the current pixel. In block 512, writing the filtered pixel value for the current pixel back into the memory buffer. In block 514, displaying the filtered pixel value on a display.

The following examples describe various embodiments of methods and systems (e.g., machines, devices, or other apparatus) discussed herein.

1. A method of recursive filtering of image data, comprising:
   receiving sequentially a plurality of original pixel values;
   multiplying an original pixel value of a current pixel of the plurality of pixel values by a dynamically varying recursion coefficient;
   adding recursively filtered pixel values from left and right neighbors (optionally with vertical offset) of the current pixel, retrieved from a memory buffer holding filtered pixel data from a previous image line;
   multiplying the added recursively pixel values by 1 minus the dynamically varying recursion coefficient;
   adding the two multiplication results together to yield a filtered pixel value for the current pixel;
   writing the filtered pixel value for the current pixel back into the memory buffer; and
   displaying the filtered pixel value on a display.

2. The method of example 1, wherein the left and right neighbors are 2 pixels to the left and right, respectively, of the current pixel.

3. The method of any of the preceding examples, further comprising low pass filtering the recursively filtered pixel values from left and right neighbors of the current pixel.

4. The method of any of the preceding examples, further comprising increasing dynamically varying recursion coefficient upon the detection of detail and lowering the dynamically varying recursion coefficient when detail is not detected.

5. The method of any of the preceding examples, wherein the lowering is at a rate less than the increasing.

6. The method of any of the preceding examples, further comprising dithered rounding of the filtered pixel value for the current pixel before the displaying.

7. The method of any of the preceding examples, further comprising generating a drift signal, low pass filtering the generated drift signal, and applying the filtered drift signal to the plurality of pixel values.

8. The method of any of the preceding examples, further comprising detecting a detail comprising detail pixels and bypassing the recursively filtering of the detail pixels.

9. The method of any of the preceding examples, wherein the detecting is performed by a linear band split filter.

10. The method of any of the preceding examples, wherein the detecting is done via median filtering.

11. A system for recursive filtering of image data, comprising:
   a memory buffer,
   a multiplier configured to multiply an original pixel value of a current pixel of a plurality of pixel values by a dynamically varying recursion coefficient;
   an adder configured to add recursively filtered pixel values from left and right neighbors of the current pixel, retrieved from the memory buffer holding filtered pixel data from a previous image line;

a second multiplier configured multiply the added recursively pixel values by 1 minus the dynamically varying recursion coefficient;

a second adder configured to add the two multiplication results together to yield a filtered pixel value for the current pixel;

the memory buffer further configured to store the filtered pixel value for the current pixel; and an output port configured to export the filtered pixel value for display on a display.

12. The system of any of the preceding examples, wherein the left and right neighbors are 2 pixels to the left and right, respectively, of the current pixel.

13. The system of any of the preceding examples, further comprising a low pass filter configured to low pass filter the recursively filtered pixel values from left and right neighbors of the current pixel.

14. The system of any of the preceding examples, further comprising a detail sensor configured to increase the dynamically varying recursion coefficient upon the detection of detail and lowering the dynamically varying recursion coefficient when detail is not detected.

15. The system of any of the preceding examples, wherein the lowering is at a rate less than the increasing.

16. The system of any of the preceding examples, further comprising a dithered rounder configured to dither round the filtered pixel value for the current pixel before the displaying.

17. The system of any of the preceding examples, further comprising a recursive filter configured to generate a drift signal.

18. The system of any of the preceding examples, further comprising a detail sensor configured to detect a detail comprising detail pixels and bypassing the recursively filtering of the detail pixels.

19. The system of any of the preceding examples, wherein the detail sensor includes a linear band split filter.

20. The system of any of the preceding examples, wherein the detail sensor includes a median filter.

Although examples have been described with reference to specific example embodiments or methods, it will be evident that various modifications and changes may be made to these embodiments without departing from the broader scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of recursive filtering of image data, comprising:

receiving sequentially a plurality of original pixel values;

multiplying an original pixel value of a current pixel of the plurality of pixel values by a dynamically varying recursion coefficient;

generating a drift signal, low pass filtering the generated drift signal, and adding the filtered drift signal to recursively filtered pixel values for the current pixel;

adding the recursively filtered pixel values with drift signal from left and right neighbors of the current pixel, retrieved from a memory buffer holding filtered pixel data from a previous image line;

multiplying the added recursively filtered pixel values by 1 minus the dynamically varying recursion coefficient;

adding the two multiplication results together to yield a filtered pixel value for the current pixel;

writing the filtered pixel value for the current pixel back into the memory buffer;

detecting a detail comprising detail pixels and bypassing the recursive filtering of the detail pixels;

generating a residue signal from the bypassed detail pixels and adding the residue signal to the filtered pixel value; and displaying the filtered pixel value with the residue signal on a display.

2. The method of claim 1, wherein the left and right neighbors are 2 pixels to the left and right, respectively, of the current pixel.

3. The method of claim 1, further comprising low pass filtering the recursively filtered pixel values from left and right neighbors of the current pixel.

4. The method of claim 1, further comprising increasing the dynamically varying recursion coefficient upon the detection of detail and decreasing the dynamically varying recursion coefficient when detail is not detected.

5. The method of claim 4, wherein a rate of change of the decreasing of the dynamically varying recursion coefficient is kept at a lower rate than a rate of change of the increasing of the dynamically varying recursion coefficient.

6. The method of claim 1, further comprising dithered rounding of the filtered pixel value with residue signal for the current pixel before the displaying.

7. The method of claim 1, further comprising detecting a detail comprising detail pixels and bypassing the recursive filtering of the detail pixels, wherein the detecting is done via median filtering.

8. The method of claim 7, wherein the detecting is performed by a linear band split filter.

9. A system for recursive filtering of image data, comprising:

a memory buffer, a multiplier configured to multiply an original pixel value of a current pixel of a plurality of pixel values by a dynamically varying recursion coefficient;

a recursive filter configured to generate a drift signal;

a low pass filter to filter the generated drift signal and add the filtered drift signal to recursively filtered pixel values for the current pixel;

an adder configured to add the recursively filtered pixel values with drift signal from left and right neighbors of the current pixel, retrieved from the memory buffer holding filtered pixel data from a previous image line;

a second multiplier configured multiply the added recursively pixel values by 1 minus the dynamically varying recursion coefficient;

a second adder configured to add the two multiplication results together to yield a filtered pixel value for the current pixel;

the memory buffer further configured to store the filtered pixel value for the current pixel; and an output port configured to export the filtered pixel value for display on a display.

10. The system of claim 9, wherein the left and right neighbors are 2 pixels to the left and right, respectively, of the current pixel.

11. The system of claim 9, further comprising a low pass filter configured to low pass filter the recursively filtered pixel values from left and right neighbors of the current pixel.

12. The system of claim 9, further comprising a detail sensor configured to increase the dynamically varying recursion coefficient upon the detection of detail and decrease the dynamically varying recursion coefficient when detail is not detected.

13. The system of claim 12, wherein a rate of change of the decrease of the dynamically varying recursion coefficient is kept at a lower rate than a rate of change of the increase of the dynamically varying recursion coefficient.

14. The system of claim 9, further comprising a dithered rounder configured to dither round the filtered pixel value for the current pixel before the displaying.

15. The system of claim 9, further comprising a median filter configured to separate a detail comprising detail pixels and bypassing the recursive filtering of the detail pixels.

* * * * *